Patented Aug. 25, 1953

2,650,202

UNITED STATES PATENT OFFICE 2,650,202

PRODUCTION OF SILICATE ADSORBENT

Russell J. Hawes, Cranford, N. J., and Charles C. Winding, Ithaca, N. Y., assignors to Tide Water Associated Oil Company, New York, N. Y., a corporation of Delaware No Drawing. Application February 15, 1951, Serial No. 211,185

10 Claims. (Cl. 252—449)

The present invention relates to the preparation of adsorbent materials and, more particularly, of silicate adsorbent materials adapted for refining of liquids, such as adsorbent decolorization of petroleum lubricating oils by the percolation method.

Those skilled in the art are aware of the use of solid adsorbent materials of natural or synthetic origin for removal of coloring matter or otherwise refining of liquids and solutions. The adsorbent treatment of petroleum fractions, especially oils of lubricating character, is an important illustrative example of such usage. For such treatment, two distinct methods are in general use, one of which is commonly designated as "contact treatment" and the other as "percolation treatment." These operations differ radically in manipulative detail and each is predicated upon and requires a distinct type and form of adsorbent material. The contact method comprises agitation of a slurry of the adsorbent and the liquid to be decolorized, followed by removal of the adsorbent from the decolorized liquid, and depends upon use of the adsorbent in such finely divided condition (e. g. about 200 to about 300 mesh) that hardness or resistance to attrition of the adsorbent particles is secondary to high activity and oil retention characteristics. On the other hand, percolation treatment, in which the liquid is filtered through a bed of granular adsorbent particles and the adsorbent is alternatively revivified and reused numerous times, requires a relatively coarse granular adsorbent material (e. g. about 15 to 30 mesh, or about 30 to 60 mesh, and the like), which must have a sufficient degree of hardness to withstand breakdown and, hence, avoid packing and high pressure drops through fixed bed filters as well as to minimize attrition losses. Thus, depending upon the contemplated usage of an adsorbent, distinct and different physical properties or characteristics are required thereof and a given size adsorbent material is not equally efficient and satisfactory as both a contact agent and a percolant. In other words, adsorbent compositions having the form and properties necessary for contact usage have no utility in the percolation method while adsorbent material of form and properties necessary for percolant usage will not function efficiently as a contact agent. The present invention is concerned with the preparation of the relatively hard granular type of adsorbent materials as distinguished from the soft powdery type.

As is apparent to those skilled in the art, an important aim in manufacture of a particular adsorbent material is the obtainment of the highest possible yield of material having particle size and other characteristics desired for the particular refining method in which the adsorbent is to used. In the preparation of synthetic adsorbents for contemplated usage in the contact method, no particular difficulty is encountered in producing high yields of properly sized materials as, generally speaking, obtainment of the required finely divided materials in substantial amount is an inherent result of numerous adsorbent production methods and, even should larger than desired particle sizes be obtained in such methods, such particles are generally readily reducible by conventional methods, as by mechanical grinding, to the desired relatively small particle size suitable for contact treatment. A more difficult problem is involved, however, in the preparation of optimum yields of larger sized particles such as those suitable for percolant adsorbents as, in processes of which we are aware for direct production of such larger sized particles, a substantial amount of fines, i. e. particle sizes too small for the desired use, are unavoidably obtained and, especially so, in processes involving use of grinding or other reducing means. The efficiency of these processes is obviously decreased as the yield ratio of larger particles to fines is decreased. Hence, and for example, in processes for direct production of synthetic percolant adsorbents as the desired end product, and particularly adsorbents of the silicate type discussed more fully hereinafter, a marked advance in the art is represented by discoveries that lead to obtaining an increased yield ratio of percolant to fines. A still more marked advance in the art is represented by discoveries that provide for conversion of fines, such as those unavoidably produced during preparation of percolant-size materials, to hard percolant-size materials that possess activity and other properties desired of percolant adsorbents and which are as satisfactory for such usage as the percolant-size materials directly obtained in the process in which the fines are unavoidably produced. The present invention is directed to and has as its prime object the obtainment in improved yield of silicate adsorbents of desired particle size in a simple and efficacious process involving the conversion of particles of a suitable metal silicate finer than desired size to particles of larger size and other desired adsorbent characteristics.

In one aspect, the invention is particularly adapted for application to the process for producing synthetic silicate percolation grade adsorbents described in patents such as C. C. Winding, U. S. Patent Nos. 2,359,342, 2,359,343, 2,359,344, 2,359,345, and 2,359,346 to effect an increased yield of percolant adsorbent. The processes of those patents, incorporated by reference herein, comprise the precipitation, under controlled conditions, of a silicate of a metal replaceable in an ionic or base exchange reaction with an alkaline earth metal, which for purposes herein includes calcium, barium, strontium and magnesium, drying the precipitate to a hard, grindable material, grinding the dried material to produce percolant-size particles (usually 30 to 60 mesh size) and subjecting the percolant-size particles to an ionic or base exchange reaction to replace the metal of said precipitated silicate with an alkaline earth metal. The resulting particles containing the "exchange" metal silicate are of substantially the same percolant-size as those entering the exchange reaction and possess high decolorizing activities, high resistance to attrition and other properties desired in percolant adsorbents.

In the step of grinding the dried precipitate in the above-described patented processes, the production of an appreciable proportion of fines, i. e. particles of smaller than desired percolant-size, is unavoidable when using conventional, presently available grinding means. Such fines, though of relatively hard structure, if subjected to the ionic or base exchange reaction described hereinabove, are not thereby increased in size to form the desired percolant-size material and, hence, heretofore have been considered as loss for this purpose. In accordance with one embodiment or application of the present invention these fines may be recovered in the process as useful percolant adsorbent as will be more fully described hereinafter.

Accordingly, one object of the invention is to provide an improved process for the production of percolant grade silicate adsorbent through ionic or base exchange reaction. Another object is to improve the ratio of percolant grade silicate adsorbent to fines produced in a process for making percolant grade adsorbents involving an ionic or base exchange reaction by conversion of fines to percolant-size particles for use in the exchange reaction.

A broader object is to convert relatively small particles of a silicate of a metal, replaceable by an alkaline earth metal in an ionic or base exchange reaction, to larger particles suitable for use in said exchange reaction to produce active silicate material. A specific object is to convert relatively small particles of a silicate of a metal, replaceable by magnesium in an ionic or base exchange reaction, to larger particles suitable for use in said exchange reaction to produce a hard, active magnesium silicate material.

The invention is based upon the discovery that suitable silicates of particle size characteristics undesired for particular uses may be converted to larger and more desirable particle size materials if incorporated in an aqueous mass in controlled particle sizes, by virtue of which the aqueous mass can be dried to a hard material that can be ground to produce a substantial proportional amount of the desired larger particle size material. The ground material of desired particle size may be subjected to the stated ionic or base exchange treatment to produce exchange silicate particles substantially undiminished in size and possessing other desired characteristics. Accordingly, the invention comprises, as an essential step, the provision of an aqueous mass of a suitable metal silicate in relatively small particles, the particle size characteristics being controlled to produce, upon drying of said mass, a hard cake grindable to percolant-size particles. More specifically as to the control of size characteristics, the silicate particles of the aqueous mass must have a relatively low average size, i. e. of less than about ten microns, preferably less than about 5 microns, and for best results, an appreciable proportion, as for example, about 20% to about 30%, of the silicate particles of the aqueous mass should be in the lower end of this range, such as of 1 or 2 microns in particle size or less. It is preferred that the aqueous mass, which may be a suspension of the particles in water, should not include particles greater than about 20 to 30 microns in size; however, a minor fraction, as about 5% to about 10%, of particles of controlled maximum sizes above 20 to 30 microns may be tolerated. The presence of larger particles reduces the effectiveness of the process; for example, experiment indicates that particles larger than about 40 microns are not convertible to the desired final product and their presence in the mass along with the stated desired smaller sized particles does not appear to have any beneficial effect. It should be obvious, however, and as is stated hereinafter, that the controlled particle size mass may contain particles of over 40 microns in size as the presence of such particles in the mass, though they may tend to reduce the yield of desired percolant material as compared to yields from particle masses substantially devoid of over 40 micron size particles, does not render the process inoperative with respect to conversion of the smaller convertible particles in the mass. In illustration thereof, the data for Examples 8 and 9 in Table III (set forth hereinafter) show that substantial conversion to percolants is obtainable by use of particle masses that contain particles up to about 50 and 100 microns, respectively, but which are of such relatively low average particle size that a substantial amount of sufficiently smaller size convertible particles are present in the mass.

Although the scope of this invention is intended to include practice thereof with precipitated silicates of a metal replaceable in the aforestated exchange reaction to form hard, non-readily powderable active adsorbents and which may be produced by processes other than disclosed in the aforesaid Winding patents, the invention is of particular utility as an improvement of the Winding patent processes. Hence, for purposes of illustration and not limitation, the invention is described hereinafter with emphasis on said processes, a specific illustration thereof being the following procedural operations for preparation of hard granular synthetic magnesium silicate adsorbents of percolant-size.

(a) A 0.3 molar aqueous solution of sodium silicate (based on Na₂O content) is heated to 200° F. and, while vigorously stirring the silicate solution, an equivalent amount of a 0.3 molar aqueous solution of calcium chloride or a calcium chloride-magnesium chloride mixture in 3:1 molar ratio is rapidly added to the silicate solution, the chloride solution also having been heated to 200° F. The reactant mixture is stirred for 5 minutes while maintaining the temperature at 200° F.

(b) The hot suspension resulting from (a) is filtered to provide a filter cake of precipitated metal silicate (e. g. precipitated calcium silicate or mixed calcium and magnesium silicates).

(c) The filter cake obtained from (b) is washed with hot water to remove water-soluble salts, and dried by suction.

(d) The thus dried filter cake is then subjected to further drying by placing the filter cake in a furnace preheated to about 550° C. and heated therein for about one to about two hours to provide a hard material which can be ground to hard discrete particles.

(e) The dried filter cake obtained from (d) is ground by suitable means (e. g. a hammer mill) until the cake has been reduced to particles passing through a 30 mesh screen. The material is then classified into particles that (1) pass through a 30 mesh screen but are retained on a 60 mesh screen and are of percolant-size, and (2) into material that passes through the 30 mesh screen and which is smaller than desired size for use as percolants.

(f) The particles of 30 to 60 mesh size obtained from (e) are then subjected to cation or base exchange reaction with a 0.3 molar aqueous solution of magnesium chloride by adding the particles to the solution heated to 200° F. and decanting the solution after a contact period of one hour. The treatment with the magnesium chloride soltuion is repeated twice with fresh batches of magnesium chloride solution except that the hot solution is added to the wet silicate. The thus treated silicate is washed, filtered, and dried overnight at 135° C., to provide hard granular percolant-size synthetic magnesium silicates that possess a decolorizing activity of about 160 (volume per cent Florex fuller's earth) and are resistant to attrition as evidenced by values as low as 19.6% upon being subjected to a breakdown test as described hereinafter.

In such a process, the yield of smaller than desired materials produced in (e) usually amounts to about 20 to 30%, a yield of 27.4% based on the weight of the dried precipitated silicate being a specific illustration thereof. Such smaller than desired size material usually ranges in size from about 74 or less to about 246 microns.

In accordance with one embodiment, the invention contemplates using, for conversion to particles of larger desired size, a mass of particles having an average particle size of less than about 10 microns and preferably an average particle size of less than about five microns and, still more preferably, a mass having an average particle size of less than about 5 microns, containing an appreciable proportion of particles of one or two microns or less, in size, and preferably substantially devoid of or containing only small amounts of particles greater than 40 microns in size; or, and especially in the application of the invention as an improved modification of the detailed processes hereinbefore described and disclosed in the aforesaid Winding patents, optimum improvements in the yield of materials of larger desired size may be obtained by subjecting all or substantially all of the smaller than desired size particles, such as obtained in step (e) of the aforedescribed process, to reduction in particle sizes to obtain a mass of particles having an average particle size as set forth hereinbefore. An aqueous mass of such particles of controlled size characteristics has been found to provide, upon filtering and drying thereof, a hard mass that is grindable or otherwise reducible to particles of desired size. For example, fines such as produced in the aforesaid detailed example may be ground, as by wet reduction in a colloid mill, to an average particle size of less than 10 microns, e. g., less than about 5 microns, and dried to form a hard cake reducible by suitable means, such as a hammer mill, to particles of larger size than the fines before grinding. With specific reference to the aforesaid detailed example and wherein percolant-size adsorbents are the desired end product, the hard cake formed by the discussed reduction of the fines may be ground to yield a substantial amount of percolant-size material that may be subjected to the stated ionic or base exchange reaction to yield hard, active percolant adsorbents that are highly resistant to attrition and which adsorbents are comparable with respect to such characteristics to the percolant-size material obtained by the stated exchange reaction of percolant-size precipitated metal silicate, such as the 30–60 mesh material obtained in step (e) of the aforedescribed process.

In the following tabulation (Table I), the markedly effective conversion of smaller than desired metal silicate particles to particles of larger size is illustrated by use of finer than percolant sized material obtained by grinding of a precipitated metal silicate obtained in a process such as described hereinbefore. In the table, the heading designated "percent (by weight) percolant sized particles obtained from dried mass of reduced fines" relates to the percentage by weight of material of 30–60 mesh size obtained by hammer mill grinding to percolant-size particles of the dried cake of reduced fines prepared in accordance with this invention. The heading designated "percent breakdown (by weight) of percolant-size magnesium exchanged particles obtained from reduced mass of fines" relates to the amount of material of finer than 60 mesh produced by subjecting to a breakdown test, as described hereinafter, the exchanged percolant-size material obtained from the dried mass of fines treated in accordance with this invention. The heading entitled "decolorizing activity—volume percent Florex fuller's earth" relates to the decolorizing activity of percolant-size adsorbents, obtained by subjecting to ionic or exchange reaction with magnesium, the percolant-size particles obtained by grinding of the hard mass produced from the fines treated in accordance with this invention, as compared to the activity of unused heat treated (tempered) Florex fuller's earth, an oil refining adsorbent of the clay type known to those skilled in the art. More specifically, the data set forth in Table I relates to preparation of percolants by reduction by wet (aqueous) grinding in a colloid mill (Examples 1, 2 and 3) and dry grinding in a micronizer mill (Example 4) of a finer than 60 mesh material obtained by grinding of a hard, precipitated metal silicate prepared by the method described in detail hereinbefore using sodium silicate and calcium chloride (Example 1) or a mixed calcium chloride-magnesium chloride solution (Ca:Mg ratio of 3:1) as reactants (Examples 2, 3 and 4). The finer than 60 mesh material obtained by grinding of the precipitated dried calcium silicate or mixed calcium-magnesium silicate, upon being further ground to a mass of average particle size shown in the table, was filtered and the filter cake dried for a period of one to two hours in a furnace preheated to 550° C., to provide a hard cake grindable to discrete particles. The dried cake was then ground to percolant-size material and the thus obtained percolant-size materials subjected to ionic or base exchange reaction with an aqueous 0.3 molar solution of magnesium chloride. The resulting magnesium silicate material of percolant-size was then subjected to test for resistance to breakdown and decolorizing activity in accordance with procedures for measurement of color and breakdown characteristics as described hereinafter.

duction to particles of controlled size characteristics. As is apparent from the water content Table I

| Example No. | Particle Size of Reduced Mass of Fines | Percent (by weight) of Percolant Sized Particles Obtained From Dried Mass of Reduced Fines | Percent (by weight) Breakdown of Percolant Size Magnesium Exchanged Particles Obtained From Reduced Mass of Fines | Decolorizing Activity, Volume Percent Florex Fuller's Earth |
|---|---|---|---|---|
| 1 | Substantially all within the range of 1–5 microns. | 75 | 21.5 | 152 |
| 2 | ....do.... | 69 | 21.6 | 156 |
| 3 | ....do.... | 70 | 23.4 | 161 |
| 4 | Substantially all within the range of 1–10 microns. | 72 | 32.2 | 140 |

From the data presented in Table I, it is evident that by use, in practicing this invention, of a mass having a low average particle size, highly effective conversion thereof to percolant size particles is obtained as evidenced by the conversions of 69 to 75% shown for Examples 1 to 4. It is further apparent from the data in Table I that along with the highly effective conversion of fines to percolant-size particles, the percolant-size particles thus obtained, upon being subjected to the stated ionic or base exchange reaction, provide highly active adsorbents of excellent resistance to breakdown. Such characteristics are apparent from the values given in Table I as compared to the percolant-size adsorbents obtained directly from the precipitated metal silicate and typical characteristics of which have been set forth hereinbefore.

Table II also sets forth data for conversion of fines to percolants in accordance with this invention and also shows values for resistance to breakdown and decolorizing activity of the metal silicates obtained by ionic or exchange reaction of the percolant-size conversion products produced from the fines. In general, the data reported in Table II are similar to those of Table I except that in Table II varying amounts of water were present in the fines subjected to reduction to particles of controlled size characteristics. As is apparent from the water content values of Examples 5 and 6 of Table II, the present invention may be suitably practiced by use of fines having a rather wide range of water content. The employment of material of relatively high water content as the charge to the reducing operation is advantageous; firstly, for economic reasons, since the filter cake of precipitate need be dried only sufficiently to permit grinding and secondly, the final product from the exchange reaction is generally superior.

Table II

| Example No. | Particle Size of Reduced Mass of Fines | Water Content (by weight) of Reduced Mass of Fines | Percent (by weight) of Percolant Sized Particles Obtained From Dried Mass of Reduced Fines | Percent Breakdown (by weight) of Percolant-Size Magnesium Exchanged Particles Obtained From Reduced Mass of Fines | Decolorizing Activity, Volume Percent Florex Fuller's Earth |
|---|---|---|---|---|---|
| 5 | Substantially all within the range of 1–5 microns. | 60 | 76 | 21.8 | 169 |
| 6 | ....do.... | 9.9 | 75 | 21.5 | 152 |

For comparative purposes, and in order to illustrate the importance of using a mass of silicates exhibiting controlled particle size characteristics, reference is made to the data in Table III wherein fines obtained by the process discussed in detail hereinbefore were reduced in size to a mass having an average particle size in excess of, and/or containing larger particles than in the preceding tables. As shown in Table III the conversion, if any, of fines to percolant size particles was substantially less than that obtained by use of a mass of contemplated particle size characteristics such as illustrated by those of Tables I and II and which are highly satisfactory for practice of this invention. Moreover, the Table III examples exhibit much greater breakdown in the form of the exchanged derivatives as compared to those set forth for the examples in Tables I and II.

Table III

| Example No. | Particle Size Characteristics of Reduced Mass of Fines (in microns) | | Percent (by weight) of Percolant-Size Particles From Dried Mass of Fines | Percent (by weight) Breakdown of Percolant-Size Particles Obtained From the Fines and Subjected to Exchange with Magnesium | Decolorizing Activity, Volume Percent Florex Fuller's Earth |
|---|---|---|---|---|---|
| | Range | Average | | | |
| 7 | 43–53 | 48 | 0 | | |
| 8 | Less than 1 to 50 | 15 | 55 | 33.6 | 151 |
| 9 | Less than 1 to 100 | 1–5 | 50 | 36.9 | 141 |

In the tables, the reported data for "decolorizing activity—volume percent Florex fuller's earth" relates to percolation treatment, with magnesium exchanged percolant-size material obtained by conversion of the fines, of an undecolorized, undewaxed Pennsylvania lubricating oil stock having an optical density color value of 2460-O. D. color as measured by the method of Ferris and McIlvain as described in Industrial and Engineering Chemistry, Analytical edition 6, 23 (1934), except that a Bausch and Lomb monochromatic green filter was used as the source of monochromatic light. The reported activity values are those obtained as compared to the activity of unused heat temperature Florex fuller's earth under identical conditions. In the percolation test, the oil was diluted with naphtha to give a solution of 40% oil and 60% naphtha by volume. The oil solution was then run slowly through a bed of the adsorbent, said bed consisting of 100 cc. of adsorbent (measured without tapping), the bed being 21 inches deep. The adsorbent was maintained at approximately 135° F. during filtration of the oil therethrough. When the oil in all of the oil solution which had passed through the filter had reached a color corresponding to a 7 ASTM color as determined by comparisons with samples of known color, the run was considered complete.

As reported herein, the particle size data are based on determination thereof by visual analysis by use of a microscope with a graduated scale and inspection of the particles thereon without orienting the particles under examination. The data reported in the tables for "percent breakdown," and which data indicates the resistance to attrition of the adsorbents, was determined by the following method:

A 130 cc. sample of the percolant is thoroughly screened by shaking the sample for ten minutes in a Ro-Tap machine. The screened sample is dried for three hours at 275° F. and 95 cc. of the dried sample is measured into a 100 cc. graduate, inverted once, and topped off to exactly 100 cc. The 100 cc. sample, together with ten 5/8-inch steel balls are placed in the 8-inch bottom pan of a Tyler standard screen set and shaken in the Ro-Tap machine for exactly eight minutes, the tap hammer being disconnected. The steel balls are removed, brushed free of adhering adsorbent, and the adsorbent is transferred to a 60 mesh screen and shaken in the Ro-Tap machine for twenty minutes. The portion of the sample retained on the 60 mesh screen and the portion of the sample that passes through the 60 mesh screen are weighed and calculated as percent hardness and breakdown values, respectively, of the sample.

Even greater ratios of percolant to fines can be obtained in practicing the invention in its application to production of percolant adsorbents in the process descrbed above, if the fines from each grinding are processed as abovedescribed and returned to the exchange reaction. Thus it is contemplated, as within the scope of this invention, to regrind the fines from the second grinding (e. g. from grinding the hard cake resulting from drying the material from the colloid mill) to controlled particle size characteristics for reduction to further amounts of percolant-size material.

While the invention has been described hereinabove in certain of its more specific embodiments in improving the yield of percolant adsorbent by controlled reduction of the fines from grinding of a precipitated silicate, it is contemplated that the invention may have broader application. Instead of wet grinding, as in a colloid mill, which gives an aqueous mass, dry grinding and/or classification of suitable materials to controlled particle size characteristics may be employed advantageously, followed by agitation of the resulting particles with water to form an aqueous suspension which can be dried, filtered and ground to relatively large particles having the desired utility and such is within the contemplated scope of the invention.

We claim:

1. A method for preparing hard granular particles of percolant size from a mass of sub-percolant size particles of a hard granular silicate of an alkaline earth metal replaceable in ionic or base exchange reaction with another alkaline earth metal which comprises the steps of (a) producing from said mass a controlled size particle mass having an average particle size not in excess of about 15 microns, containing not more than a small amount of particles over 40 microns in size and such that particles in said controlled size particle mass cohere upon drying, said step (a) including the addition of water to at least one of the aforesaid masses in an amount sufficient to provide said controlled size particle mass as an aqueous slurry, and (b) drying said aqueous slurry of the controlled size particle mass to a hard dry mass reducible to a substantial amount of hard granular percolant size particles.

2. A method, as defined in claim 1, wherein the controlled size particle mass is further characterized by containing not over substantially ten per cent of particles above the size range of about 20 to about 30 microns and is substantially devoid of particles over about 40 microns in size.

3. A method, as defined in claim 1, wherein the controlled size particle mass has an average particle size of less than about 10 microns and contains a substantial amount of particles having a particle size of about 2 microns and less.

4. A method, as defined in claim 1, wherein the controlled size particle mass is produced by grinding the mass of sub-percolant size particles.

5. A method, as defined in claim 4, wherein the aqueous slurry of the controlled size particle mass is produced by grinding the sub-percolant size mass in an aqueous medium.

6. A method, as defined in claim 4, wherein the aqueous slurry of the controlled size particle mass is prepared by dry grinding the mass of sub-percolant size particles, and adding water to the resulting controlled size particle mass in an amount sufficient to form a slurry thereof.

7. In the preparation of hard granular synthetic alkaline earth metal silicates of percolant size by ionic or base exchange reaction of an alkaline earth metal with a silicate of another alkaline earth metal and which latter silicate is grindable to particles of percolant size and a sub-percolant size particle mass, the method for converting said sub-percolant size particle mass to hard granular particles of percolant size which comprises the steps of (a) producing from said sub-percolant size particle mass a controlled size particle mass having an average particle size not in excess of about 15 microns, containing not more than a small amount of particles over 50 microns in size and such that particles in said controlled size particle mass cohere upon drying, said step (a) including the addition of water to at least one of the aforesaid masses in an amount sufficient to provide an aqueous slurry of the controlled size particle mass, and (b) drying said aqueous slurry of the controlled size particle mass to a hard dry mass reducible to a substantial amount of hard granular size particles.

8. In the preparation of hard granular synthetic magnesium silicate adsorbents by reacting under controlled conditions an aqueous solution of a salt of an alkaline earth metal exchangeable in ionic or base exchange reaction with magnesium to form a precipitated alkaline earth metal silicate driable to a hard mass reducible to particles of percolant size with unavoidable production of a sub-percolant size particle mass, the method for converting a substantial amount of said sub-percolant size particle mass to hard granular particles of percolant size which comprises the steps of (a) producing from said sub-percolant size particle mass a controlled size particle mass that has an average particle size of less than about ten microns, contains not over substantially ten per cent of particles above the size range of about twenty to about thirty microns and contains a substantial amount of particles of about two and less microns in size, said step (a) including the addition of water to at least one of the aforesaid masses in an amount sufficient to provide an aqueous slurry of the controlled size particle mass, (b) drying said aqueous slurry of the controlled size particle mass to a hard dry mass, (c) reducing said hard dry mass to particles of percolant size, and (d) subjecting said percolant size particles to ionic or base exchange reaction with magnesium.

9. A method, as defined in claim 8, wherein the aqueous solution of an alkali metal silicate is an aqueous solution of sodium silicate, the aqueous solution of a salt of an alkaline earth metal is an aqueous solution of a salt of a metal from the group consisting of calcium and mixtures of calcium with magnesium, and the controlled size particle mass is produced by grinding of the unavoidably produced sub-percolant particle size mass.

10. A method, as defined in claim 8 wherein the aqueous solution of the alkali metal silicate has a molarity of about 0.08 to about 0.4, based on the metal oxide content of said silicate, the alkaline earth metal salt solution has a molarity of about 0.08 to about 0.4, and the controlled size particle mass has an average particle size of less than about 5 microns.

RUSSELL J. HAWES.
CHARLES C. WINDING.

References Cited in the file of this patent
UNITED STATES PATENTS

| Number | Name | Date |
|---|---|---|
| 2,146,718 | Bond | June 3, 1936 |
| 2,359,344 | Winding | Oct. 3, 1944 |
| 2,410,284 | Gunness et al. | Oct. 29, 1946 |
| 2,510,823 | Krebs | June 6, 1950 |

Certificate of Correction

Patent No. 2,650,202 August 25, 1953

RUSSELL J. HAWES ET AL.

It is hereby certified that error appears in the printed specification of the above numbered patent requiring correction as follows:

Columns 7 and 8, Table II, in the heading to column 5 thereof, for "(by weight) o" read *(by weight) of*; column 9, line 15, for "temperature" read *tempered*;

and that the said Letters Patent should be read as corrected above, so that the same may conform to the record of the case in the Patent Office.

Signed and sealed this 3rd day of November, A. D. 1953.

[SEAL]

ARTHUR W. CROCKER,
*Assistant Commissioner of Patents.*